US012564115B2

(12) United States Patent
Hoover

(10) Patent No.: US 12,564,115 B2
(45) Date of Patent: Mar. 3, 2026

(54) FIRE SUPPRESSION VEGETATION REMOVAL SAFETY KIT

(71) Applicant: Xylem I LLC, Norfolk, VA (US)

(72) Inventor: Randolph D Hoover, Virginia Beach, VA (US)

(73) Assignee: Xylem I LLC, Norfolk, VA (US)

( * ) Notice: Subject to any disclaimer, the term of this patent is extended or adjusted under 35 U.S.C. 154(b) by 0 days.

(21) Appl. No.: 18/672,742

(22) Filed: May 23, 2024

(65) Prior Publication Data

US 2025/0359498 A1    Nov. 27, 2025

(51) Int. Cl.
| | |
|---|---|
| *A01B 1/04* | (2006.01) |
| *A01B 1/02* | (2006.01) |
| *A01B 1/12* | (2006.01) |
| *A01B 1/20* | (2006.01) |
| *A01D 7/04* | (2006.01) |

(52) U.S. Cl.
CPC .................. *A01B 1/04* (2013.01); *A01B 1/02* (2013.01); *A01B 1/12* (2013.01); *A01B 1/20* (2013.01); *A01D 7/04* (2013.01)

(58) Field of Classification Search
CPC .... A01B 1/00; A01B 1/04; A01B 1/12; A01D 7/04
See application file for complete search history.

(56) References Cited

U.S. PATENT DOCUMENTS

| | | | | | |
|---|---|---|---|---|---|
| 332,350 | A | * | 12/1885 | Kretsinger | A01B 1/20 |
| | | | | | 172/380 |
| 1,749,103 | A | * | 3/1930 | Kortick | B25G 1/00 |
| | | | | | 15/236.08 |
| 3,824,641 | A | * | 7/1974 | Shandel | B25F 1/02 |
| | | | | | 403/373 |
| 4,247,141 | A | * | 1/1981 | Grint | A01B 1/02 |
| | | | | | 294/49 |
| 4,901,801 | A | * | 2/1990 | Popivalo | A01B 1/20 |
| | | | | | 294/51 |
| 5,297,306 | A | * | 3/1994 | Shandel | B25F 1/02 |
| | | | | | 7/114 |
| 7,604,640 | B2 | * | 10/2009 | Kana | B25B 19/00 |
| | | | | | 81/463 |
| 7,987,658 | B1 | * | 8/2011 | Fragale | A01D 7/04 |
| | | | | | 15/144.1 |
| 8,388,031 | B1 | * | 3/2013 | Zang | A01B 1/04 |
| | | | | | 294/55.5 |

(Continued)

FOREIGN PATENT DOCUMENTS

DE        2005/065439        *    7/2005

*Primary Examiner* — Gary S Hartmann

(74) *Attorney, Agent, or Firm* — Woods Rogers PLC; Timothy Bechen

(57)        ABSTRACT

A fire suppression vegetation clearing kit provides for effective vegetation removal operations associated with fire suppression activities while ensuring user safety in operation with an industrial grade wood-chipper. The kit comprises a spade and a rakehoe. In this kit, each of the tools are composed of a non-metal material and are made of a unitary composition or a combination of non-metal materials. Each tool excludes open-loop handles, such that users are unable to loop a handle, arm, or anything else through the handle. The kit is also usable with a shovel having a non-open-loop handle. The shovel, spade, and rakehoe allow for vegetation clearing activities.

8 Claims, 5 Drawing Sheets

(56)     References Cited

U.S. PATENT DOCUMENTS

| | | | | |
|---|---|---|---|---|
| 9,050,717 | B2 * | 6/2015 | Mouch | B25G 3/12 |
| 9,320,188 | B1 * | 4/2016 | Ruppert | A01B 1/02 |
| 9,757,851 | B2 * | 9/2017 | Meinzer | B25G 1/04 |
| 12,052,937 | B2 * | 8/2024 | Dittman | A01B 1/22 |
| 2005/0230985 | A1 * | 10/2005 | Thiele | A01B 1/04 |
| | | | | 294/49 |
| 2008/0309105 | A1 * | 12/2008 | Hayner | A01B 1/00 |
| | | | | 294/49 |
| 2012/0017561 | A1 * | 1/2012 | Fragale | A01D 7/04 |
| | | | | 56/400.04 |
| 2020/0072379 | A1 * | 3/2020 | Grimm | F16K 31/46 |
| 2022/0151125 | A1 * | 5/2022 | Dittman | A01B 1/04 |
| 2024/0107981 | A1 * | 4/2024 | Himes | A01K 13/002 |

* cited by examiner

FIRE SUPPRESSION VEGETATION REMOVAL SAFETY KIT

RELATED APPLICATIONS

There are no related applications.

FIELD OF THE INVENTION

The invention relates generally to vegetation removal and more specifically to a kit for improving safety associated with vegetation removal.

BACKGROUND

There are known tools available for fire suppression teams seeking to control or otherwise suppress vegetation fires, such as forest fires, wild fires, brush fires, etc.

In addition to water or liquid solutions, fire suppression can also include containment strategies with individuals working on the ground. These containment steps include brushing debris, shoveling debris, clearing an area of ground-based debris, etc.

There are three primary tools available for fire suppression. The first tool is a deep shovel. The second tool has a two-sided head, with a rake on the first side of the head and a hoe on the second side of the head. The third tool is a spade, where the spade primarily includes a pointed tip for insertion into the ground and the shovel includes a front lip portion for scooping or otherwise collecting ground-based debris.

Due to the nature of fire suppression and operating conditions, it is customary for these tools to be made out of metal. In other manufacturing embodiments, at least the head portion, e.g. the portion that engages the ground, is made out of metal and a post or shaft can be made of use wood.

Another common manufacturing technical includes looped handles for improving user grip during use.

These tools are made of industrial grade materials, typically metal, to withstand the rigors of daily use. Medal is used for the tip portions and can be used for the handle portions. The shafts can be either manufactured with wood, metal, or fiberglass. These tools are readily known and individually available from any local hardware store or other tool distribution source.

In the past several years, there appears to be an increase in the propensity and intensity of large scale fires. It is not uncommon for these fires to be ignited by power lines, lightening strikes, or human error.

As part of the efforts to minimize large scale fires, it is common for crews to take an active preventive role in vegetation management. This active preventive role can be before an active fire scenario or can also be in response to an active fire.

For example, crews may attend to clearing activities for an area, including removing tree limbs, clearing vegetive debris, among other actions. Clearing activities commonly include collecting the debris and then clearing the debris using a high-powered industrial-grade wood chipper.

These shredding devices are highly effective but highly dangerous. There exists a fatal deficiency in the available tools for debris clearing activities and current shredding devices. The power of a shredder is such that one should not ever use a metal tool for pushing debris into the shredder. If a metal component of a tool connects with the teeth of a shredder, the resulting kickback of the tool will almost guarantee serious, if not fatal, injury to the user.

Even worse, under no circumstances should a metal tool with a looped handle be used with a chipper. If the user's hand is caught within the looped handle and the metal parts of the tool makes contact, the user can be literally pulled directly through the chipper. There have been reported deaths of individuals being pulled through a chipper after getting a hand caught inside a handle.

Therefore, any company that has a worker using an industrial grade chipping device must not allow a user to push or feed debris into the device with a metal tool, much less a metal tool having a looped handle. But, currently, the available tool-based resources for vegetation clearing have metal tips and many have looped handles.

As such, there exists a need for a vegetation clearing kit usable with an industrial-grade or high-power shredding device, commonly referred to as a wood chipper.

BRIEF DESCRIPTION

The present invention provides a kit for fire suppression vegetation removal usable with an industrial-grade wood chipper. The kit includes a spade and a rakehoe. The spade includes a spade head disposed at a distal end of spade shaft. The rakehoe includes a rakehoe head disposed at a distal end of rakehoe shaft.

Within the kit, the items are made of at least one non-metal material.

In one embodiment, the non-metal material is plastic, such as ABS and a poly carbonate infused material.

Within the kit, where the shafts include a handle, the handle is specifically not an open handle, where an open handle is a handle capable of having a user appendix fit therethrough. Handles can be grips affixed over the natural shafts. Handles can be curved elements, similar to a paddle handle, without an opening in the middle.

In further embodiments, the spade head and/or the rake-hoe head can include structural ribbing elements. The ribbing elements providing additional structural integrity for the head in view of the head being composed of a non-metal material.

Herein, the kit consisting tools providing for fire suppression vegetation clearing but also usable with an industrial grade wood chipper. The kit offers the functional benefits for vegetation clearing while ensuring the safety of workers. If any one of the tools of the kit were accidentally in contact with the chipper, the tool itself would simply disintegrate as it was pulled through the shredder, leaving the worker unharmed.

A further embodiment incudes a shovel usable with the kit. The shovel includes a shovel head, in one embodiment a deep shovel head, disposed at a distal end of a shovel shaft. The shovel includes a non-open handle, whereby a user can then safely use the shovel in relation to an industrial grade wood chipper without being pulled into the gears or teeth of the chipper. In one embodiment the shovel can be made of one or more non-metal materials. Whereas, because the handle is a non-open handle, the shovel can be made of metal without adding occupational risk to the user.

BRIEF DESCRIPTION OF THE DRAWINGS

The invention will be described with respect to the following drawing figures, in which like numerals represent like features throughout the description, and in which.

DETAILED DESCRIPTION

A kit includes at least a rakehoe and a spade, wherein the rakehoe and spade are made of plastic or other non-metal construction, providing for safe vegetation removal while ensuring user safety. The kit can be used with vegetation removal associated with fire suppression activities. The kit can also be used with a shovel having a non-open handle.

Figures 1, 2:
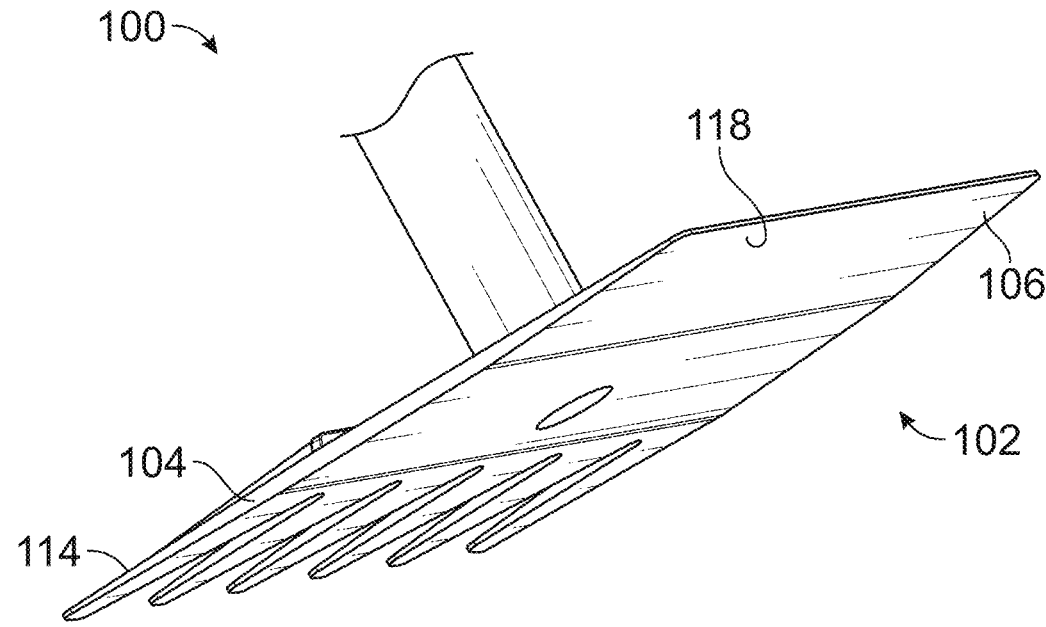
FIGS. 1-3 are illustrations of one embodiment of a rakehoe as part of the vegetation clearing kit.
Figures 3, 4:
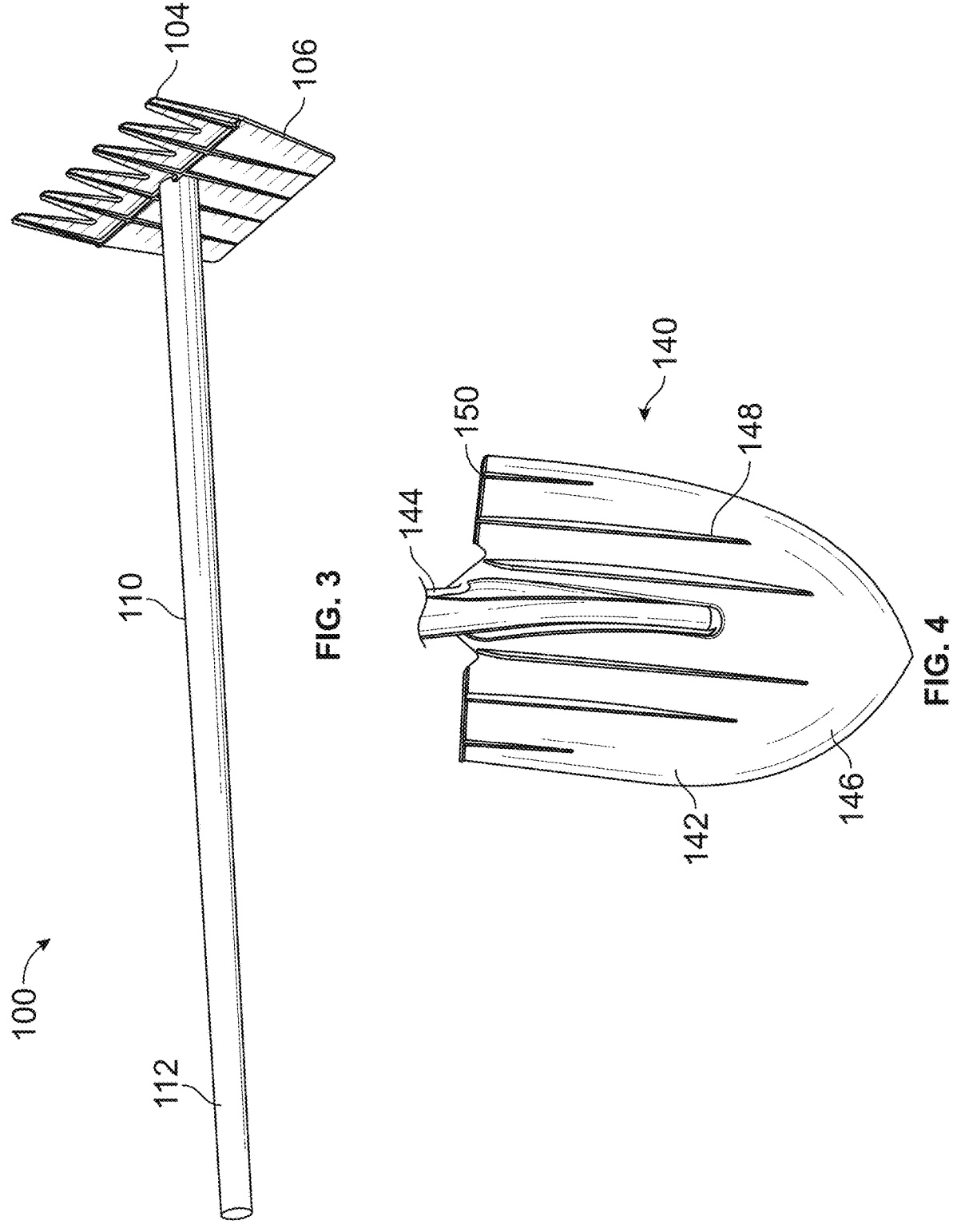
FIGS. 4-6 are illustrations of one embodiment of a spade as part of the vegetation clearing kit.

FIGS. 1-3 illustrate varying perspective views of one embodiment of a rakehoe 100. The rakehoe includes a head 102 having a rake side 104 and a hoe side 106. As visible in FIG. 3, a shaft 110 connects to the head 102 at a proximal end and has a handle 112 at a distal end.

The embodiment of FIG. 3 illustrates a unitary construction, the rakehoe 100 assembled in a single unit. In another embodiment, not illustrated, the head can include a connector assembly securing a shaft to the head, where the pieces are manufactured separately and later combined using any suitable connecting technique.

The rake side 104 of the head 102 includes a plurality of tines 114. In one embodiment, the tines 114 can include support structures 116, as visible in FIG. 2, providing additional structural stability. In one embodiment, the support structures 116 are disposed on an interior side.

The hoe side 106 of the head 102 includes a flat edge 118. Also visible in FIG. 2, the support structures 116 can extend up to the edge 118 on the interior side.

Where the head 102 is made of a non-metal material, such as an injection-molded plastic or being three-dimensionally printed, the shaft 110 connects to the head and extends upward from the interior side.

Further visible in FIG. 3, the distal end of the shaft 110 includes the handle 112, which can be any suitable handle without having an opening or any other means for allowing a user to stick an appendage therethrough. One embodiment can include a rubberized element affixed over the end of the shaft 110, providing both grip for the user and protection for the user's handling of the tool 100.

In one embodiment, the rakehoe head 102 can have a width in a range of 8 to 11 inches, with a preferred embodiment of 9.5 inches. The thickness of the head 102, including any structural elements therein, can be within a range of 0.2 inches to 0.5 inches, with a preferred embodiment of 0.34 inches. The shaft 110 can have a height within a range of 40 inches to 52 inches, with a preferred embodiment of 46 inches. Moreover, the shaft 110 can have a diameter between 1.15 and 1.45 inches, with a preferred embodiment of 1.29 inches.

The rakehoe head 102, having 2 separate faces, can have varying dimensions for the faces. The rake 104, in one embodiment, has a width as noted above, with a preferred embodiment of 9.5 inches. In one embodiment, the rake 104 includes 6 tines, each spaced approximately 1.76 inches apart from a centerline. The angled opening for the tines can, in one embodiment be at an angle of approximately 20 degrees.

The hoe 106 can, in one embodiment, have a smaller width than the rake 104. In one embodiment, the hoe width is approximately 8.05 inches or within a range of 80 percent to 90 percent of the width rake 104.

Figure 5:
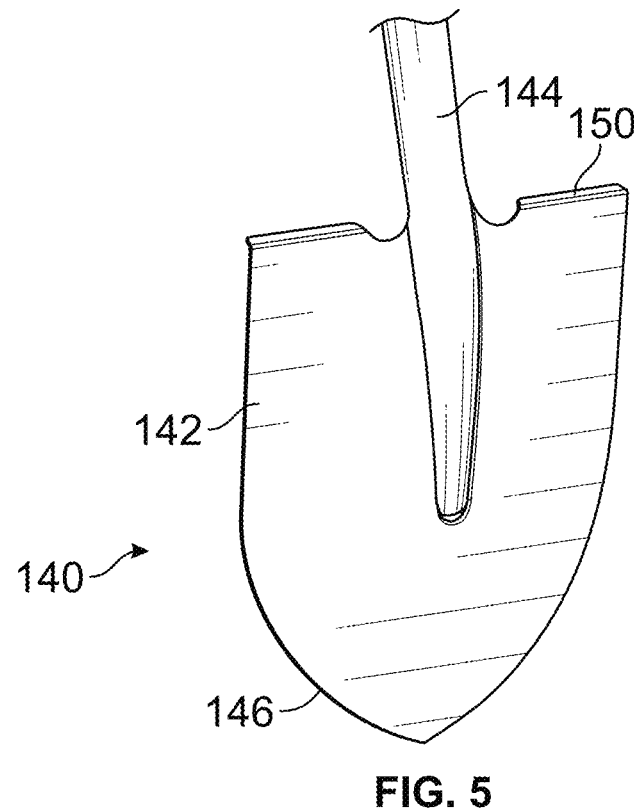
Figure 6:
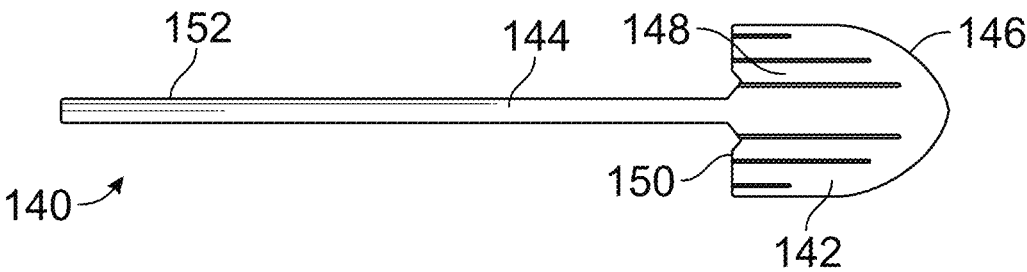

The kit for vegetation clearing further includes a spade. FIGS. 4-6 illustrate one embodiment of a spade 140 having a head 142 and shaft 144. The head 142 includes curved front lip 146 forming a point, consistent with known spade designs.

Varying embodiments may include ribs 148 on a front face portion of the head 142. These ribs 148 can provide structural support for the head 142, wherein the head 142 is made out of a non-metal material and thus more susceptible to flexing during use. The ribs 148, offering structural support, improve usability of the spade 140 and prevents tool failure including the head 142 from cracking or snapping during use.

Further embodiments may include step edges 150 on a top portion of the head 142. These edges 150 are similar to known spade technology, for example allowing the user to place a foot on the edge 150 for driving the spade 140 into dirt or other piles. As visible in FIGS. 4 and 6, one embodiment includes the ribs 148 extending up to the edges 150 providing further stability and support for the non-metal structure.

Similar to the rakehoe, in this embodiment the shovel 140 is composed of a unitary construction made of a non-metal material. The shaft 152 extends upward from the head 142.

In another embodiment, the shovel head and shaft may be separate elements. In that embodiment, the shovel would includes a shaft connector that can have a circular aperture allowing for the shaft to fit therein. The shaft can then be engaged with the connector using any suitable technique, including for example fasteners tightening the connector around the shaft or in another example the shaft having a central aperture for fitting a bolt or other fastener through the outside of the shaft connector.

The head 142 is made of any suitable non-metal material, which can be, in one embodiment, the same material as the rakehoe of FIGS. 1-3. The head 142 can be three-dimensionally printed, injection molded, are any other suitable manufacturing technique.

The shaft 152 can be made of any suitable non-metal material, including for example plastic, fiberglass, wood, etc.

As noted in FIG. 6, the shaft 144 connects at the proximal end, having a handle 152 at the distal end. For safety reasons, the handle 152 does not include an open loop or any other means for the user to stick an appendage, such as a handle, wrist, arm, therethrough. In one embodiment, the handle 152 can be a rubberized cap fitting over and conforming in shape to the shaft 144.

The spade 140 can have dimensions similar to the rakehoe noted above. For example, the shaft 144 can have a height within a range of 30 inches to 40 inches, with a preferred embodiment of 35 inches. Moreover, the shaft 144 can have a diameter between 1.15 and 1.45 inches, with a preferred embodiment of 1.29 inches.

The head 142 can have a width within a range of 7.5 inches to 10 inches, with a preferred embodiment of 8.78 inches. The head 142 can also have a height between 9.5 inches and 12 inches, with a preferred embodiment of approximately 11 inches. Therefore, in a preferred embodiment, the spade 140 has a total height of approximately 46 inches.

In one embodiment, the spade head 142 can be titled forward of the shaft 144. In one embodiment the total distance between a back of the shaft 144 to the front edge of the tip 146 of spade can be a distance of approximately 5.2 inches.

Figures 7, 8, 9:
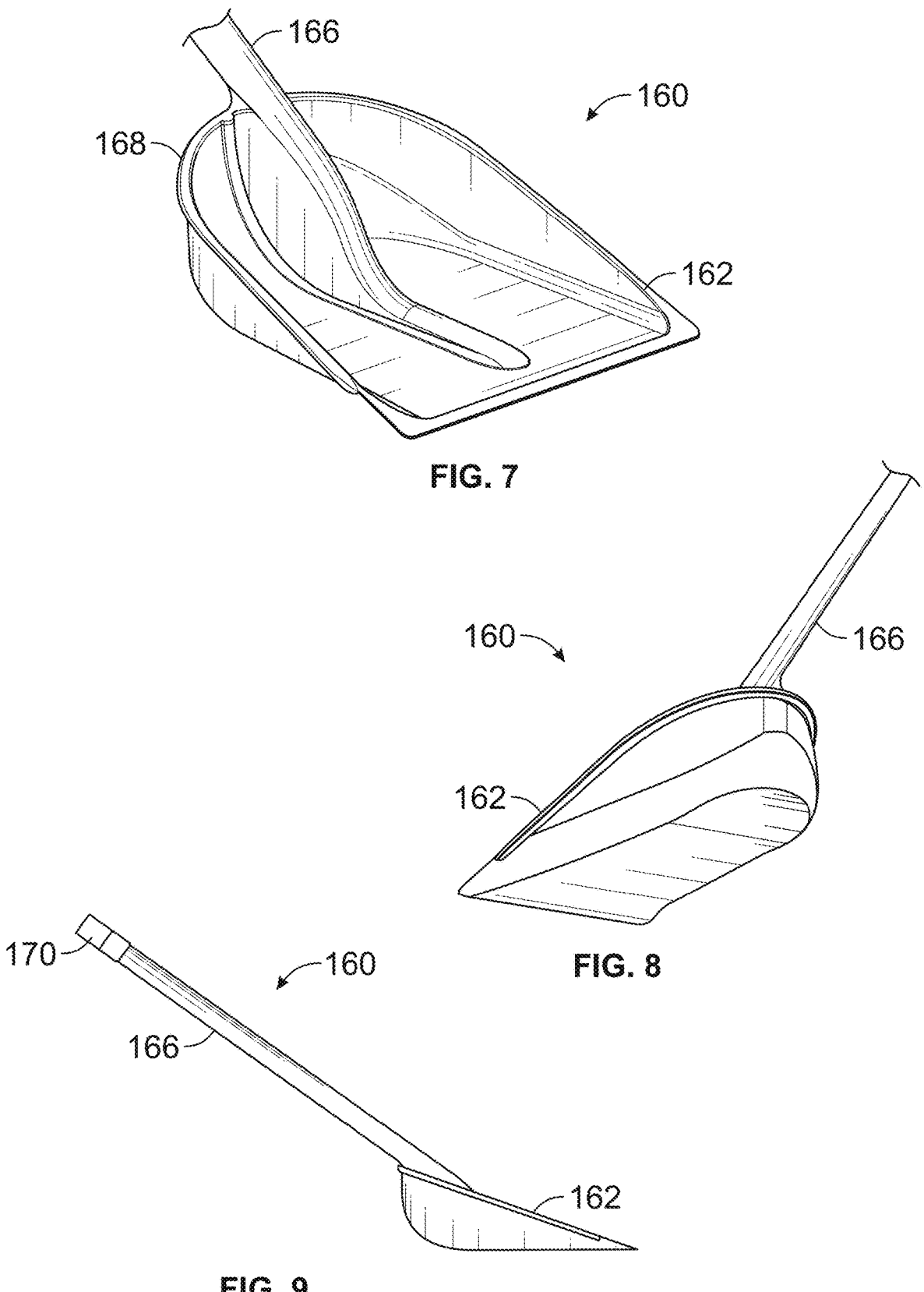
FIGS. 7-9 are illustrations of one embodiment of a deep shovel usable with the kit.

The kit is usable with a deep shovel. FIGS. 7-9 illustrate one embodiment of a deep shovel 160 having a head 162, and shaft 166. The head 162 include a deep pocket for larger volume scooping or shoveling operations and includes a unique handle structure allowing for safe use with an industrial grade wood chipper.

As visible in FIG. 7, the head 162 can include structural elements 168 for providing additional stability and/or rigidity in the head 162.

The embodiment of FIGS. 7-9 is made of a unitary construction. In further embodiments, the head 162 and shaft 166 may be separate elements and later combined via a shaft connector, similar to embodiments of the rakehoe and spade noted above.

The head 162 is composed of a non-metal material. Similar to the rakehoe and the spade, the head 162 may be made of plastic or any other suitable non-metal material. The manufacturing can be via three-dimensional printing, injection moldings, or any other suitable technique.

In another embodiment, the head 162 can be made of metal or other material having metal-like properties including providing structure and rigidity for shoveling operations.

In varying embodiments, the shaft 166 may also be made of any suitable non-metal material, including for example but not limited to plastic, fiberglass, wood, etc.

Figure 10:
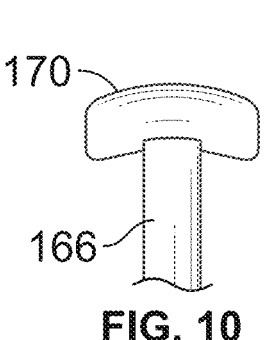
FIGS. 10-11 illustrate sample embodiments of handles.

The shaft 166 may includes a handle 170. In one embodiment, the handle 170 can have a curved shape, similar to a handle found on a paddle. FIG. 10 illustrates one embodiment of a handle 170 connected to the shaft 166. This embodiment provides for additional purchase for the user when using the shovel 160, while also excluding any type of opening or other means for a user to pass an appendage through the handle.

The shovel 160 can include varying dimensions, wherein one embodiment the head 162 includes a deep scoop angling approximately 19 degrees from the shaft 166 to a flat portion at the front of the head 162. The total distance of the shovel 160 from the front edge of the face 162 to the top of the shaft 166 and/or the top of the handle 170 can be within a range of 40 inches to 52 inches, with a preferred embodiment of 46 inches. Moreover, the shaft 110 can have a diameter between 1.25 and 1.6 inches, with a preferred embodiment of 1.56 inches. Herein, the shaft diameter may be greater than the shaft diameters of the rakehoe and spade to accommodate the force application on the shaft during use via weight being scooped and dispensed via the head portion.

Based on the angle of the scoop, the shovel 160, when resting on a flat portion of the scoop bottom has a total height of approximately 24 inches to the top of the handle 170.

While not expressly illustrated, in further embodiments, the rakehoe and spade may also include the handle 170 disposed on the distal end of corresponding shafts.

Figure 11:
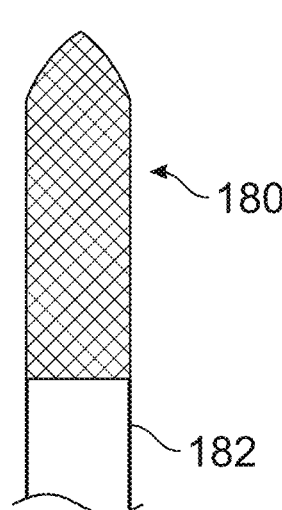

In another embodiment, the shovel handle 170, similar to the handles for the spade and rakehoe, can be any suitable design provided it does not have a loop or other open area for allowing a user to stick an appendage therethrough.

Where FIG. 10 illustrates a curved handle, FIG. 11 illustrates another embodiment for a handle including a cap 180 that fits over the shaft 182. In one embodiment, the cap 180 may be composed of a rubberized material. The cap 180 provides for added grip for the user when using the tool for vegetation clearing activities. The cap 180 can be any suitable length, example ranging from 6 inches to 18 inches, providing enough length for suitable purchase by user operating the tool.

Figure 12:
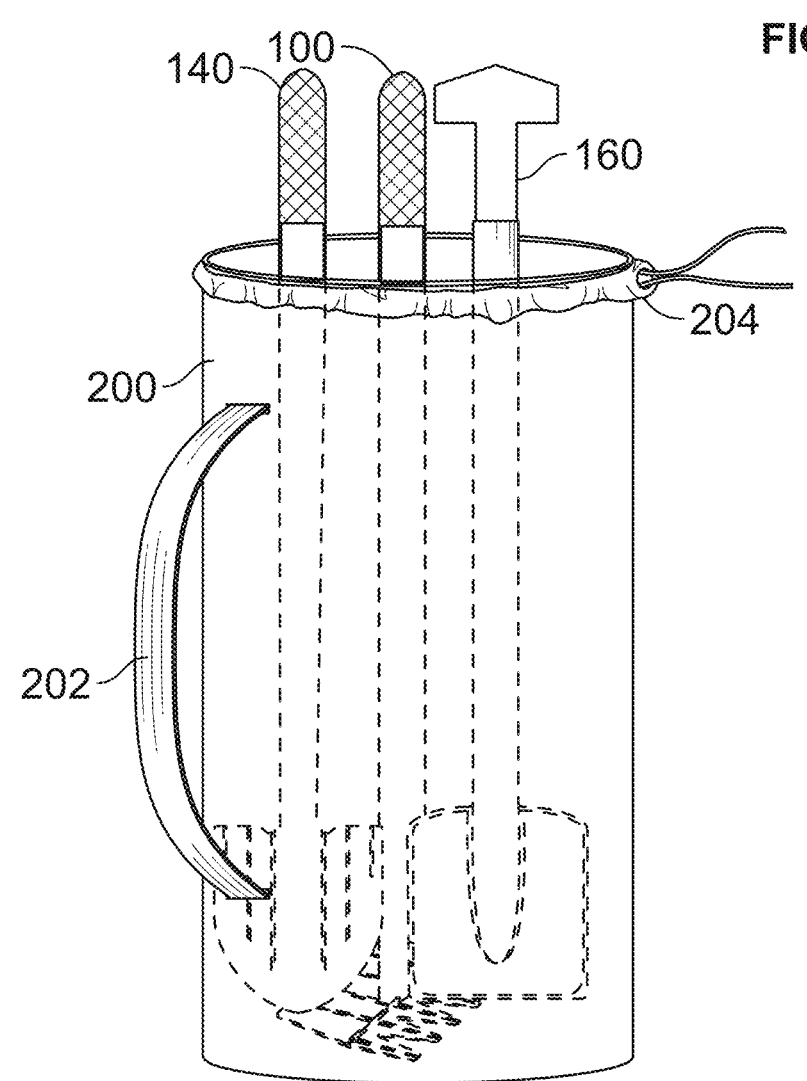
FIG. 12 illustrates one embodiment of a carrying case.

As part of the vegetation clearing activities, FIG. 12 illustrates the kit can further include a carrying case 200 having a handle 202. As illustrated, the case can include the rakehoe 100, spade 140, and shovel 160 therein. One embodiment may include a pull string 204 or any other suitable closure for securing the elements within the case 200.

Where FIG. 12 is one embodiment, any other suitable carrying or assembly case can be provided, such that the tools of the kit are centrally assembled.

Herein, the kit provides for vegetation removal associated with fire suppression and usable with industrial grade wood chippers. As used herein, an industrial grade wood chipper is any suitable wood or brush chipper having a medium to large intake feed usable within the field of brush clearance. Solely by of example, an exemplary chipper may be any of the following: AX17 Brush Chipper, AX19 Brush Chipper, BC700XL Brush Chipper, BC900XL Brush Chipper, all available from Vermeer®.

Where prior vegetation removal operations associated with fire suppression activities used metal tools for improved durability, inclusion of any industrial grade wood chipper introduces an unacceptable risk level to users, risk of the users being injured, maimed, or killed by a metal tool catching in the chipper. The kit overcomes the limitations by presenting non-metal versions of the tools and excluding any opening in the handles. Should the tools come into contact with the blades of the chipper, the tools will be destroyed and the user let without injury.

The following description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitations of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such the range should be treated as if it were individually recited. Terms of approximation such as "about," "approximately," "substantially" or the like, should be construed as referring to an allowance for deviation that is appreciated by one of ordinary skill in the art. Terms of relative ordering or orientation, such as "first," "last," "greatest", "least", "top," "bottom," "inner", "outer" and the like, should be understood to be used relative to a selected standard of comparison or perspective. Such terms of relative ordering or orientation do not preclude differing orderings or orientations when a different standard of comparison or perspective is used. No language in the description should be construed as indicating an element is a necessary or essential aspect of the disclosure.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A fire suppression vegetation clearing kit usable with an industrial-grade wood chipper, the kit comprising:

a spade including a spade head and a spade shaft composed of a unitary construction consisting of a single continuous unit of the spade head and the spade shaft excluding any intermediate components therebetween, wherein both the spade head and the spade shaft are composed entirely of a first non-metal material;

a rakehoe including a rakehoe head and a rakehoe shaft composed of a unitary construction consisting of a single continuous unit of the rakehoe head and the rakehoe shaft excluding any intermediate components therebetween and the rakehoe head and rakehoe shaft are composed entirely of a second non-metal material, the rakehoe head having a first side and a second side, the first side including a rake element having a plurality of tines extending outward therefrom and the second side include a hoe head having a substantially rectangular shape with a flat edge distal to the rakehoe shaft, such that the rakehoe head is composed of the second non-metal material including the flat edge and wherein the rakehoe head is permanently affixed to the rakehoe shaft and non-moveable relative to the rakehoe shaft; and each of the spade and the rakehoe having a handle portion consisting of a handle having a curved shape, the shape being a solid element and having a shape excluding a user appendix fitting therethrough, such that upon any contact of the spade and/or the rakehoe by a user with the wood chipper and the unitary construction without any metal and the handle portion without any apertures allows the contacting spade and/or rakehoe to be safely shredded by the wood chipper without causing bodily injury to the user.

2. The fire suppression vegetation clearing kit of claim 1, wherein the first non-metal material and/or the second non-metal material is a thermoplastic polymer.

3. The fire suppression vegetation clearing kit of claim 2, wherein the thermoplastic polymer includes acrylonitrile butadiene styrene (ABS) having a polycarbonate material infused therein.

4. The fire suppression vegetation clearing kit of claim 1 further comprising:

a shovel having a closed handle affixed thereto.

5. The fire suppression vegetation clearing kit of claim 4, wherein the closed handle has a t-shape with a surface area for user hand to grip thereonto.

6. The fire suppression vegetation clearing kit of claim 1, wherein the spade head includes a plurality of structural ribbing elements affixed thereto.

7. The fire suppression vegetation clearing kit of claim 1, wherein the rakehoe head includes a plurality of structural ribbing elements affixed thereto.

8. The fire suppression vegetation clearing kit of claim 1 further comprising:

a carrying kit capable of engaging the shovel, the spade, and the rakehoe and providing for ease of transport.

* * * * *